United States Patent
Braun

(10) Patent No.: US 10,564,961 B1
(45) Date of Patent: Feb. 18, 2020

(54) ARTIFACT REPORT FOR CLOUD-BASED OR ON-PREMISES ENVIRONMENT/SYSTEM INFRASTRUCTURE

(71) Applicant: SAP SE, Walldorf (DE)

(72) Inventor: Matthias Braun, Illingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/182,903

(22) Filed: Nov. 7, 2018

(51) Int. Cl.
G06F 8/71 (2018.01)
H04L 29/08 (2006.01)
G06F 8/60 (2018.01)
G06F 8/70 (2018.01)

(52) U.S. Cl.
CPC .............. G06F 8/71 (2013.01); G06F 8/60 (2013.01); G06F 8/70 (2013.01); H04L 67/10 (2013.01); H04L 67/34 (2013.01)

(58) Field of Classification Search
CPC .............. G06F 8/71; G06F 8/70; G06F 8/60
See application file for complete search history.

(56) References Cited

U.S. PATENT DOCUMENTS

| | | | |
|---|---|---|---|
| 9,507,578 B2 * | 11/2016 | Low | G06F 8/61 |
| 9,529,630 B1 * | 12/2016 | Fakhouri | G06F 9/5011 |
| 2011/0265077 A1 * | 10/2011 | Collison | G06F 8/71 717/172 |
| 2011/0265081 A1 * | 10/2011 | Lucovsky | G06F 8/60 717/177 |
| 2011/0265168 A1 * | 10/2011 | Lucovsky | H04L 63/0245 726/7 |
| 2012/0030672 A1 * | 2/2012 | Zygmuntowicz | G06F 8/60 718/1 |
| 2015/0378689 A1 * | 12/2015 | Low | G06F 8/61 717/110 |
| 2016/0173646 A1 * | 6/2016 | Austel | G06F 9/45558 709/204 |
| 2017/0322934 A1 * | 11/2017 | Chen | G06F 8/71 |
| 2018/0113684 A1 * | 4/2018 | Dawson | G06F 8/36 |

OTHER PUBLICATIONS

Mirna Alaisami, "Cloud-native Applications: Authoring and Evaluation of Two Deployment Patterns" (Year: 2018).*
Patros et al., "Dynamically Compiled Artifact Sharing for Clouds" (Year: 2017).*
Niharika Mittal, "Optimized Resource Matching for uploading bits in a PaaS Cloud" (Year: 2017).*

* cited by examiner

Primary Examiner — Phillip H Nguyen
(74) Attorney, Agent, or Firm — Buckley, Maschoff & Talwalker LLC

(57) ABSTRACT

According to some embodiments, an application deployment data store may contain electronic record associated with an application package uploaded by a deployer. An artifact report platform may access the application deployment data store and, based on the information in the application deployment data store, perform the following for each resource associated with a scope of a cloud-based or on-premises environment/system infrastructure: create a root artifact of a tree; detect the root artifact's set of artifacts; build an artifact dependency tree; for droplet roots, match sub-resources of droplet resource roots; and write the root artifact recursively to a result stream. Based on the result streams, the artifact report platform may output the artifact report to the remote operator device via the output port.

20 Claims, 13 Drawing Sheets

ARTIFACT REPORT FOR CLOUD-BASED OR ON-PREMISES ENVIRONMENT/SYSTEM INFRASTRUCTURE

BACKGROUND

Some cloud-based or on-premises environment/system infrastructures can be used to execute an application service. For example, SAP® HANA® Extended Application Services, Advanced model ("XSA") is a platform that can be used to develop and execute microservice-based applications in a cloud-based or on-premises environment/system. Such an infrastructure may offer a set of services that enable end-to-end support for web-based applications including persistency services and a configurable identity provider. In addition, such a platform may support polyglot application development with a core set of pre-deployed runtimes that are accepted as industry standards (e.g., Node.js or Java platform Enterprise Edition ("JavaEE")).

Modern web applications are often built on the basis of hundreds or even thousands of software components (e.g., open source components like java archives ("jar") or Node.js modules ("npm")). When these types of applications are pushed to a platform, a substantial number of components or artifacts may be involved in productive code. Moreover, a noticeable number of these artifacts may be added by the platform infrastructure itself to the application during a deployment process (which may not be not fully transparent and/or controllable for customers). Artifacts added by the platform could be, for example, frameworks, database drivers, crypto libraries, etc. As hundreds of different application (e.g., microservice) deployments might be managed by a platform, hundreds of thousands of artifacts in total might end up being deployed to the server. These artifacts can appear in many variations: in the same or different versions of a single component; as a productive part of an application currently running and serving as an Hyper-Text Transfer Protocol ("HTTP") endpoint; or even as part of a stopped service that could be subsequently activated. As a result, customers of a cloud-based or on-premises environment/ system infrastructure (e.g., a Platform-as-a-Service ("PaaS")) risk that they are not in a position to quickly get insights about current artifact states and usage.

It would therefore be desirable to provide for the automatic creation of an artifact report associated with a cloud-based or on-premises environment/system infrastructure in a fast, automatic, and accurate manner.

SUMMARY

According to some embodiments, methods and systems may include an application deployment data store may contain electronic record associated with an application package uploaded by a deployer. An artifact report platform may access the application deployment data store and, based on the information in the application deployment data store, perform the following for each resource associated with a scope of a cloud-based or on-premises environment/system infrastructure: create a root artifact of a tree; detect the root artifact's set of artifacts; build an artifact dependency tree; for droplet roots, match sub-resources of droplet resource roots; and write the root artifact recursively to a result stream. Based on the result streams, the artifact report platform may output the artifact report to the remote operator device via the output port.

Some embodiments comprise: means for accessing, by a computer processor of an artifact report platform, an application deployment data store that contains electronic records associated with an application package uploaded by a deployer; based on the information in the application deployment data store, means for performing the following for each resource associated with a scope of a cloud-based or on-premises environment/system infrastructure: create a root artifact of a tree, detect the root artifact's set of artifacts, build an artifact dependency tree, for droplet roots, match sub-resources of droplet resource roots, and write the root artifact recursively to a result stream; and based on the result streams, means for outputting an artifact report to the remote operator device via an output port.

Some technical advantages of some embodiments disclosed herein are improved systems and methods to provide for the automatic creation of an artifact report associated with a cloud-based or on-premises environment/system infrastructure in a fast, automatic, and accurate manner.

DETAILED DESCRIPTION

Figure 1:
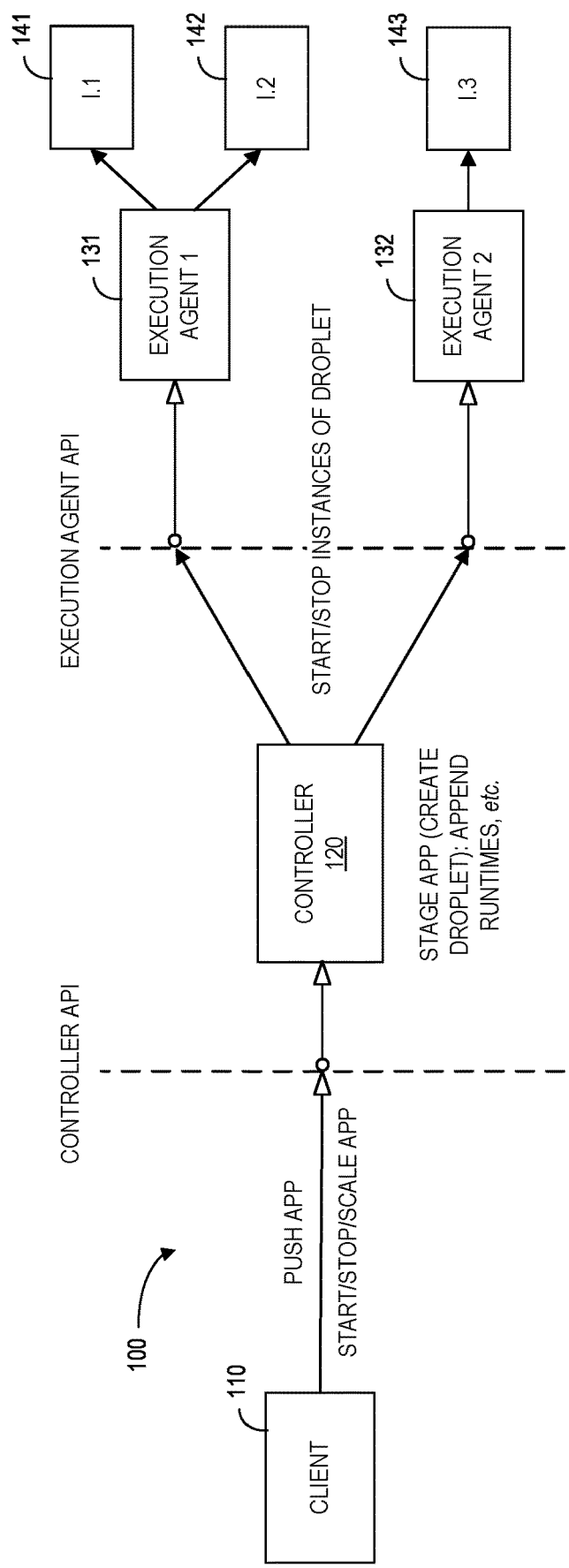
FIG. 1 illustrates a deployment of an application to a platform.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein provide an artifact report functionality that lets customers get a global overview of a potentially huge set of artifacts upon which their applications are built on (and whose code is productive). This may help accomplish several important tasks for application developers.

For example, an application developer may be able check the actual set of artifacts in (productive) applications along with the source where they came from originally. Note that this set of runtime artifacts of a deployed application may differ from the set of design-time artifacts which is determined by direct build dependencies when compiling the application for any of the following reasons: artifacts may transitively include lots of other artifacts from which they depend and the transitive closure of such artifacts is often resolved at deployment time; and during deployment, a platform may append artifacts to the application to make the application executable in the server environment and to simplify application development by providing reusable services.

As another example, an application developer may quickly find all applications and platform services that contain a specific artifact version. This might be useful, for example, when an artifact version (or a range of versions) is found to be vulnerable and needs to be patched as soon as possible. Such an ability may also be helpful when an artifact version (or a range of versions) is found to have a functional flaw and needs to be patched.

As still another example, an application developer may want to check the usage of open source or third-party artifacts. This ability can help the application developer, for example, determine the usage of outdated versions. Such a functionality can also be used to identify redundant usage of different versions of the same component and/or catch the use of artifacts with one or more license restrictions.

Initially, an application developer may deploy an application to a cloud-based or on-premises environment/system infrastructure. For example, a customer deploying an application on the platform may push the application files (e.g., a war file or a set of node modules) to a central platform service (such as a controller Application Programming Interface ("API") as described in connection with FIG. 1). Based on the provided application-specific data (i.e., the business logic), a platform may assemble an executable binary image—a so called "droplet"—which is represented as a set of files. This transformation from the application's file set to the droplet may be referred to as "staging." During staging, additional file sets (e.g., runtimes) may be downloaded from the infrastructure's repository. For example, a Java-based web application might be enriched by the platform with a runtime Java Development Kit ("JDK"), a web server providing a servlet container and additional libraries for authentication and database access via Java Database Connectivity ("JDBC").

A deployer user may later start the application that results in one or more system execution agents fetching the created droplet and starting it with the desired number of instances. According to some embodiments, users may control the number of instances of an application in order to meet load requirements at runtime. For example, FIG. 1 illustrates 100 a deployment of an application to a platform or "staging"— the transformation of an application into an executable droplet. A client 110 may push an application to a controller 120 via a controller API (e.g., to start, stop, or scale the application). The controller 120 may then stage the application by creating the droplet to deploy at runtime, etc. An execution agent API may then start or stop instances of the droplet, such as by creating "execution agent 1" 131 (associated with instances "I.1" 141 and "I.2" 142) and "execution agent 2" 132 (associated with instance "I.3" 143).

According to some embodiments, the following steps may be processed during deployment. Initially, a deployer user may upload the application package (e.g., a set of files) that may contain: application binaries containing artifacts resolved at compile time; and a manifest file or files describing dependencies to artifacts needed at runtime and meta information about the application such as a name, a vendor and a version.

The stager may then analyze the application structure and choose a proper buildpack that is available on the platform. For each supported type of application there may be a buildpack available (customer extensions are possible at runtime). For example, a Node.js application may be recognized by a package.json file in the root directory and, thus, that node buildpack may be selected to perform the staging.

The chosen buildpack may contain a compile script that defines how the resulting droplet is built on basis of the application. It may add artifacts to the droplet that are, for example: part of the buildpack itself; part of a runtime that is fetched by the buildpack from the platform and added to the droplet (e.g., the Node.js runtime or JDBC driver); downloaded from some external repository to resolve runtime dependencies of the application (e.g., npms from public npm registry), etc.

Figure 2:
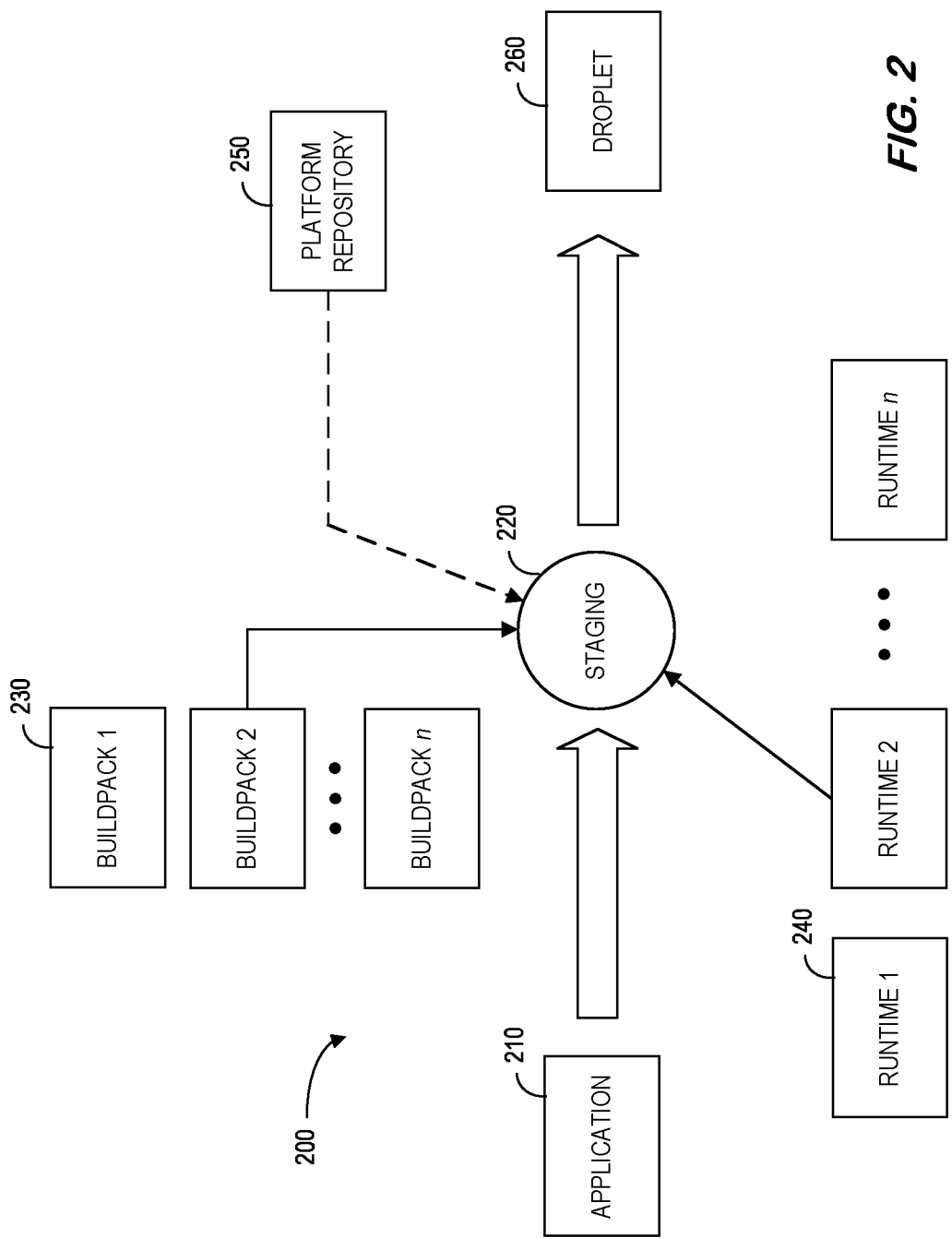
FIG. 2 illustrates staging sources.

FIG. 2 illustrates 200 staging sources. In particular, a deployed application 210 may be sent to staging 220 that uses information from buildpacks 230 (e.g., buildpack 1 through n), run times 240 (e.g., runtime 1 through n), and a platform repository 250 to create a droplet 260. According to some embodiments, the handled resources with a file-based representation like applications, buildpacks, runtimes or droplets may be stored and fetched from the platform repository 250 (e.g., an internal repository storing Binary Large Object Data ("BLOB") files where applications, buildpacks, runtimes, and staged application's BLOBs reside). The content of the files may, according to some embodiments, be stored in an optimized way with respect to disc usage. Each resource might be, for example, represented as a list of BLOB descriptions (e.g., a bill of materials) containing: the path of the BLOB (relative to the root directory of the resource); the size of the BLOB; the hash of the BLOB, etc. Note that for each hash the corresponding BLOB content might be fetched from the store. Moreover, the resources can be reconstructed at some location in the file system when fetching the BLOBS with the given hashes (e.g., by copying them to the corresponding path relative to the root directory).

Figure 3:
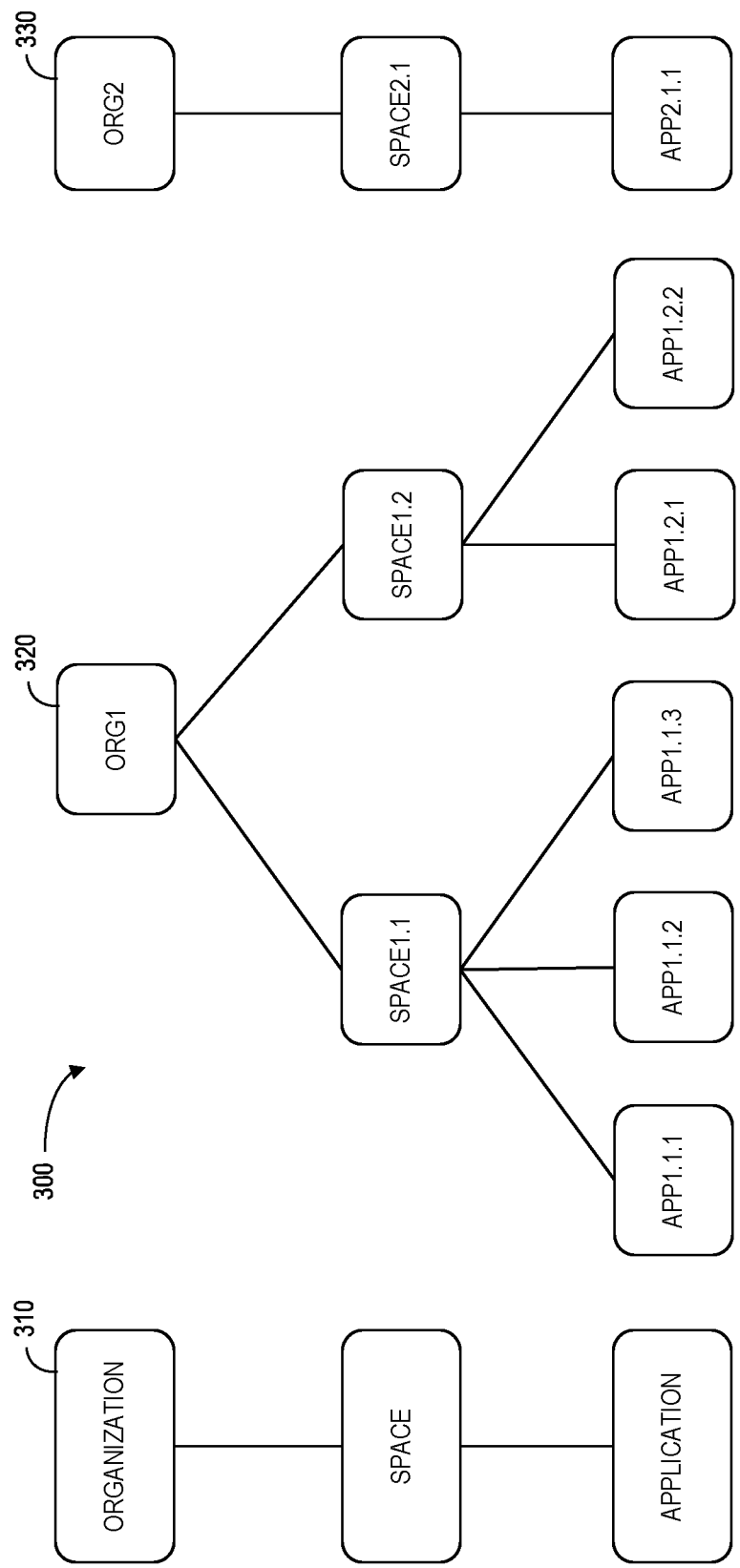
FIG. 3 is an example of how different spaces might be assigned to an organization.

To support separation at the design-time level, applications may be created in different "spaces." Typically, all microservice-based applications that form an integrated solution reside in the same space and are developed and deployed by the same group of people. In some cases, several different spaces may be assigned to a single enterprise or organization (e.g., a development area or company). FIG. 3 is an example 300 of how different spaces might be assigned to an organization 310 (e.g., allocated at a space level and an application level). A first organization "ORG1" 320 is assigned "SPACE1.1" (associated with "APP1.1.1," "APP1.1.2," and "APP1.1.3") and "SPACE1.2" (associated with "APP1.2.1" and "APP1.2.2"). A second organization "ORG2" is assigned "SPACE2.1" (associated with "APP2.1.1"). In such a situation, an artifact report might need to provide for different potential levels or scopes to be included in the report. For example, a report might be restricted to: a single resource (e.g., an application, droplet, runtime, or buildpack); multiple resources of the same type (e.g., applications, droplets, runtimes, or buildpacks); multiple resources of the same type or of different types within a container resource (e.g., a space or even an organization). In this way, an operator can filter an artifact report to focus on the most important items of interest. According to some embodiments, the scope of an artifact report may be limited to controller resources (organizations, resources, etc.) that the platform user who triggered the report is authorized to access. Note that resource scopes could be also be defined in a more generalized environment. The separation of applications and their droplets into spaces and organizations as illustrated 300 in FIG. 3 is just one example reflecting an XSA server architecture.

A controller API might, according to some embodiments, be extended by several REST-endpoints that request an artifact report with specified parameters as defined by following RAML snippets:

/artifact-report:
  description: Reports all artifacts visible for the platform user
  type: artifactReportRequest
  /droplets:
    description: Reports all artifacts in droplets visible for the platform user
    type: artifactReportRequest
    /{guid}:
      type: artifactReportRequest
  /apps:
    description: Reports all artifacts in apps visible for the platform user
    type: artifactReportRequest
    /{guid}:
      type: artifactReportRequest
  /runtimes:
    description: Reports all artifacts in runtimes visible for the platform user
    type: artifactReportRequest
    /{guid}:
      type: artifactReportRequest
  /buildpacks:
    description: Reports all artifacts in buildpacks visible for the platform user
    type: artifactReportRequest
    /{guid}:
      type: artifactReportRequest Note that the REST request type artifactReportRequest might be defined in RAML as:

get:
  queryParameters:
    space-guid:
      type: string
      description: "Limits the report to the given space"
    org-guid:
      type: string
      description: "Limits the report to the given organization"
  responses:
    200:
      body:
        application/octet-stream
    <different response codes indicating error situation>:
      body:
        schema: errorMessage The schema errorMessage might comprise, for example, a JSON object bearing detailed information about the error in a text representation.

In this way, the defined interface may meet requirements with respect to flexibility in defining different scopes of artifact analysis:

endpoint/artifact-report results in an analysis scope which includes all types of Controller resources that fulfill the query parameters (for example, all resources on the platform or a full scan);

endpoint/artifact-report/<resource-type> results in an analysis scope which includes all artifacts of a single Controller resource type <resource-type> that fulfill the query parameters (for example, all droplets on the platform to focus on productive artifacts);

endpoint/artifact-report/<resource-type>/{guid} results in an analysis scope which includes the artifacts of single controller resource of type <resource-type> and unique GUID guid that fulfills the query parameters (for example, all artifacts of a specific application); and if org-guid or space-guid is set in the query parameters, the scope may be further restricted to the organization space with the given GUID.

According to some embodiments, the response type may be a textual stream comprising an array of artifacts, and a single artifact object in the array may be reported with the following JSON structure:

```
{
  "$schema": "http://json-schema.org/draft-03/schema",
  "type": "object",
  "properties": {
    "hash": {
      "type": "string",
      "description": "unique hash of the corresponding blob."
    },
    "name": {
      "type": "string",
      "description": "Name of the artifact."
    },
    "version": {
      "type": "string",
      "description": "Version of the artifact."
    },
    "path": {
      "type": "string",
      "description": "Path relative to the root resource."
    },
    "vendor": {
      "type": "string",
      "description": "The vendor of the artifact if available."
    },
    "type": {
      "enum": [ "JAR", "NPM_MODULE", "NATIVELIB",
                "RESOURCE", <all artifact types which can be detected> ],
      "description": "The type of the artifact."
    },
    "controller-resource": {
      "type": "object",
      "properties": {
        "type": {
          "enum": [ "APP", "RUNTIME", "DROPLET", "BUILDPACK" ],
        },
        "guid": {
          "type": "string",
          "description":"The guid of the Controller resource."
        }
      }
      "description": "Resource information if available."
    },
    "info": {
```

```
        "type": "object",
        "additionalProperties": true
        "description": "Additional information if available."
    },
    "dependent-artifacts": {
        "type":"array",
        "items": {
            "$ref": "artifact"
        },
        "description": "Dependent artifacts recursively."
    }
  }
}
```

Note that each artifact object might have properties such as an artifact name, an artifact version, an artifact type, and an artifact path that help characterize the represented artifact. Moreover, the content of two artifact instances may be compared by means of a hash property which is taken from the unique blob representation in a central or platform repository. Higher level controller resources such as applications, droplets, runtimes, and buildpacks may also be represented as artefact objects. For example, they may all have type RESOURCE and be linked to the controller resource model by means of a field controller-resource exposing the GUID. Making resources higher-level artifacts may help provide a unified way of analyzing and reporting the resulting artifact structures and their dependencies. Also note that artifacts may be nested by means of the dependent-artifacts array property. This array may enumerate all dependent artifacts of a parent artefact. For example:

a npm module may list all directly dependent npms as defined in a package.json meta file; and
 all artifacts of a controller resource (e.g., an application) may be nodes of an artefact tree with the root artefact representing the controller resource.

Because the response stream enumerates artefact objects iteratively, both the server and the client may be able handle a large number of (root-) artifacts. For the server, the maximum memory footprint might be restricted, according to some embodiments, to the amount of memory needed to store the artefact tree of a single controller resource. On the client side, a single path from a root artefact to a leaf in the tree may need to be kept in memory to present the results.

Figure 4:
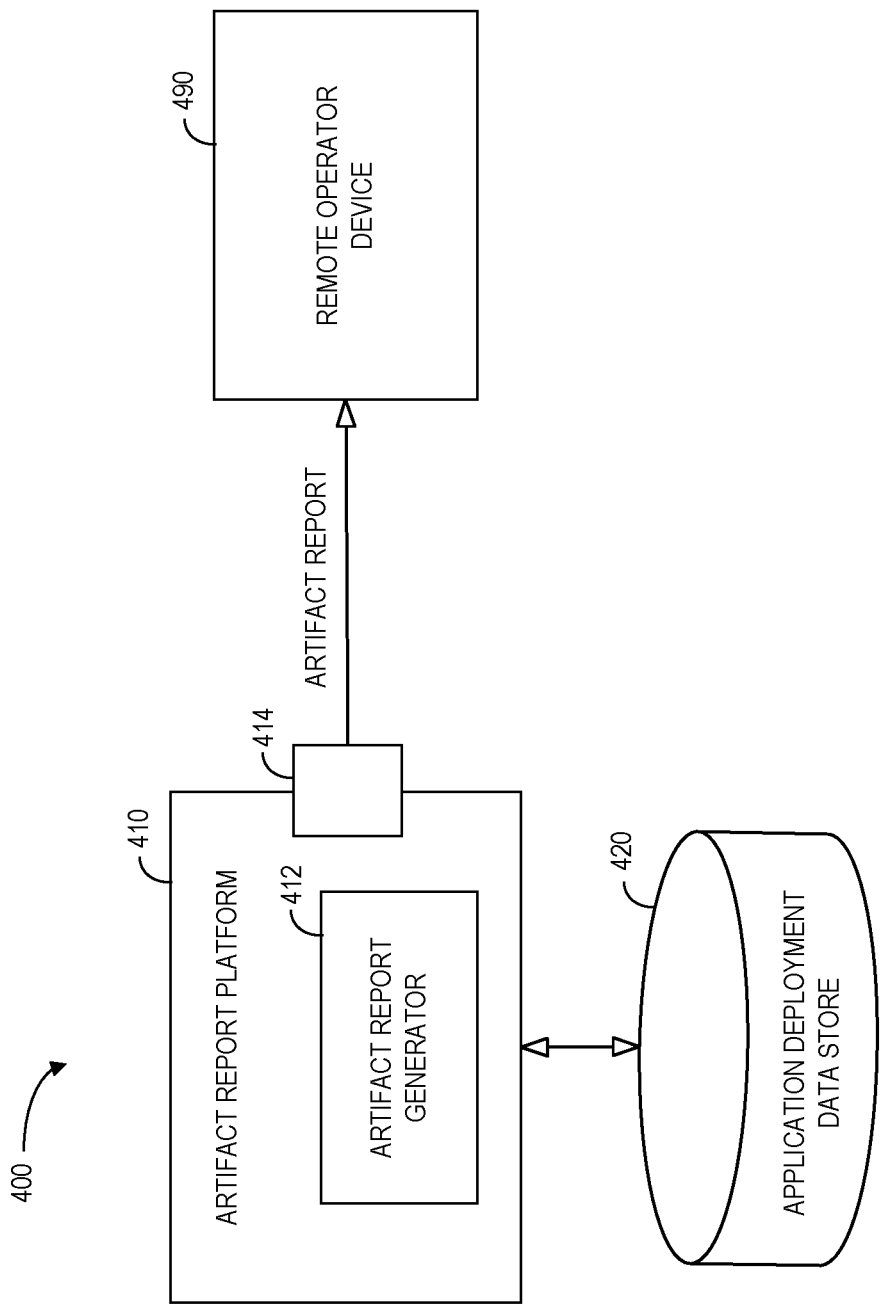
FIG. 4 is a high-level block diagram of a system in accordance with some embodiments.

FIG. 4 is a high-level block diagram of a system 400 in accordance with some embodiments. The system 400 includes an artifact report platform 410 that provides an artifact report to a remote operator device 490 via a communication port 414. In particular, the artifact report platform 410 retrieves information from an application deployment data store 420 executes an artifact report generator to create an appropriate artifact report. The process might be performed automatically or be initiated via a simple command from the remote operator device 490. As used herein, the term "automatically" may refer to, for example, actions that can be performed with little or no human intervention.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The artifact report platform 410 may store information into and/or retrieve information from various data stores, which may be locally stored or reside remote from the artifact report platform 410. Although a single artifact report platform 410 is shown in FIG. 4, any number of such devices may be included. Moreover, various devices described herein might be combined according to embodiments of the present invention. For example, in some embodiments, the application deployment data store 420 and the artifact report platform 410 might comprise a single apparatus. The system 400 functions may be performed by a constellation of networked apparatuses, such as in a distributed processing or cloud-based or on-premises environment/system architecture. Note that some embodiments may be compatible with Cloud Foundry ("CF")-based stacks.

An operator may access the system 400 via the remote operator device 490 (e.g., a Personal Computer ("PC"), tablet, or smartphone) to view information about and/or manage artifact information in accordance with any of the embodiments described herein. In some cases, an interactive graphical user interface display may let an operator or administrator define and/or adjust certain parameters (e.g., to update an artifact to a new version to remove a security problem) and/or provide or receive automatically generated recommendations or results from the system 400.

Figure 5:
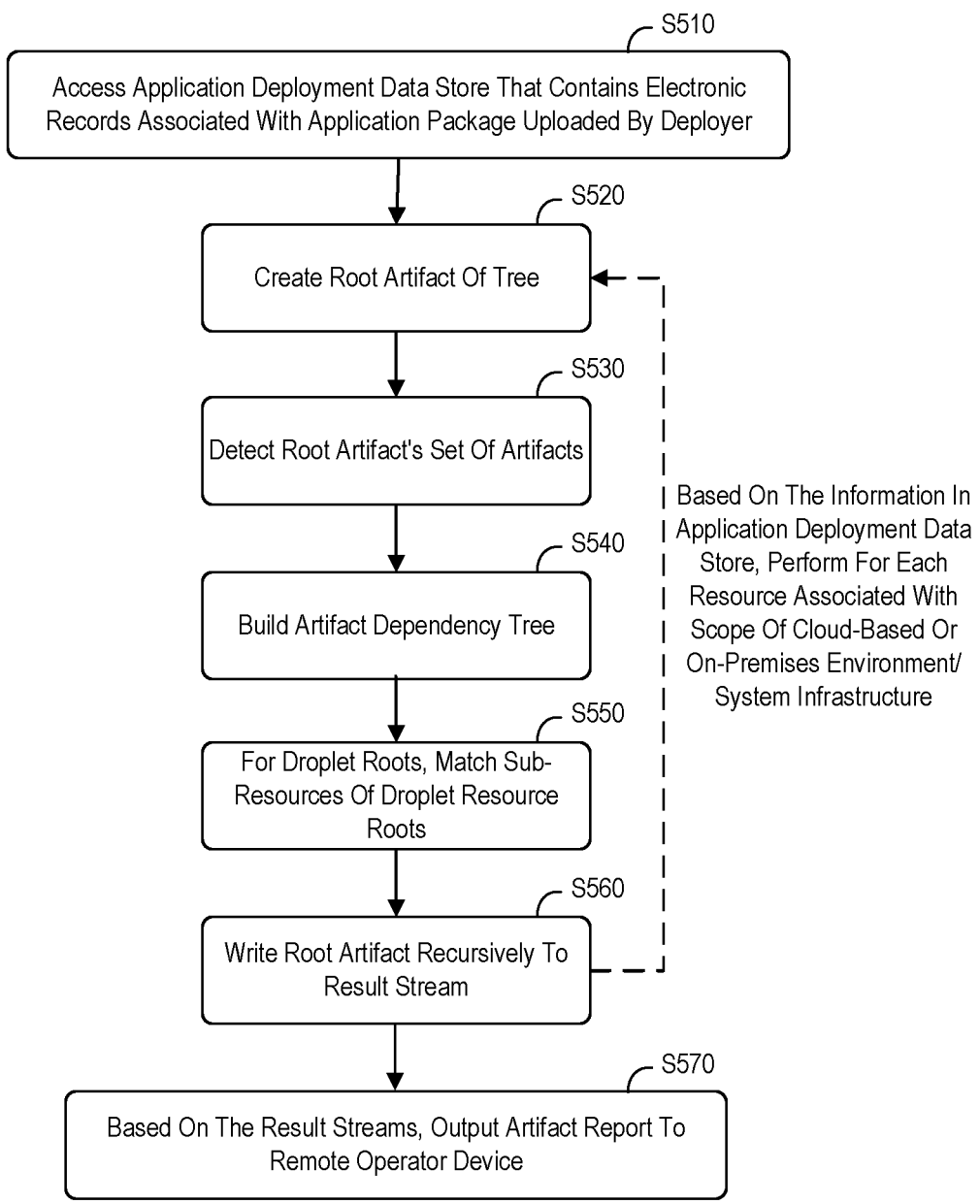
FIG. 5 is an artifact report creation method in accordance with some embodiments.

FIG. 5 shows a method that might performed by some or all of the elements of the system 400 described with respect to FIG. 4. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S510, a computer processor of an artifact report platform may access an application deployment data store that contains electronic records associated with an application package uploaded by a deployer. Based on the information in the application deployment data store, the system may perform the following steps S520 through S560 for each resource associated with a scope of a cloud-based or on-premises environment/system infrastructure (e.g., iteratively for each controller resource res within the scope of the request). The cloud-based or on-premises environment/system infrastructure might be associated with, for example, a PaaS infrastructure.

At S520, the system may create a root artifact of a tree. For example, the system may create a root artifact object ar representing res (set type to RESOURCE and link res in ar.controller-resource) as the root of the tree.

At S530, the system may detect the root artifact's set of artifacts. For example, the system may check each BLOB of res in platform repository for known artifact types by applying specific detection algorithms implemented for different artifact types (npm, jar, native lib, etc.). When a match is determined, the system may create a detected artifact object ad. If available, the system may analyze the artifact's meta information and add a proxy artifact to ad.dependent-artifacts for each listed dependency. Note that the system may add detected artifact ad itself to ar.dependent-artifacts. According to some embodiments, the proxy artifact may comprise a temporary artifact that just has an artifact type, artifact name and artifact version (e.g., as available from meta data). Note that proxy artifacts might not correspond to actual (physical) artifacts, instead them may just point to such and are to be resolved later.

At S540, the system may build an artifact dependency tree. For example, the system may, for each artifact ad in ar.dependent-artifacts:

for each artifact proxy in ad.dependent-artifacts:
search artifact resolved in ar.dependent-artifacts for a "matching" proxy; and
replace the proxy with the resolved (and remove resolved from ar.dependent-artifacts).

Note that the proxy artifact might only be described by an artifact name, artifact type, and artifact version (and not by a hash as there is no BLOB available). Also, there might be more than one artifact with same artifact name, artifact type, and artifact version in the list of detected artifacts. Among these artifacts, the selected artifact may be the one with has an artifact path that is closest to the artifact path of the parent artifact of the proxy.

For droplet roots, the system may match sub-resources of droplet resource roots at S550. For example, for the resources application, the buildpack, and all runtimes of the droplet, the system may:

build the artifact representation p of the (pattern) resource as in S520 through S540; and
for each artifact in p.dependent-artifacts find a match in ar.dependent-artifacts whereas artifacts of the corresponding artifact trees need to match recursively (in the case of full match, create artifact ap as a copy of p) and move all matching artifacts from ar.dependent-artifacts to ap.dependent-artifacts and add ap to ar.dependent-artifacts.

Note that during staging, the references to the used resources like the application, the buildpack, and zero or more runtimes may be stored by the system in the droplet resource. Moreover, a match may be defined by a hash comparison (i.e., two artifacts may match if they have exactly the same content and same dependency tree structure). Also note that a detection algorithm might also extract a bundle of artifacts that is represented as an artifact tree itself (and that is not necessarily modelled as a runtime on the platform). For example, a SAP U15 framework, spring framework, etc. could comprise this type of detected bundle. These bundles might be handled just like sub-resources in this step, matching and replacing a sub-tree in the result artifact tree. As a result, the matching at S550 is not necessarily limited to resources.

At S560, the system may write the root artifact recursively to a result stream. For example, starting from the root artifact, the system may write the JSON objects to the stream in a depth-first-search order. Based on the result streams, the system may output an artifact report to a remote operator device via an output port at S570.

Figure 6:
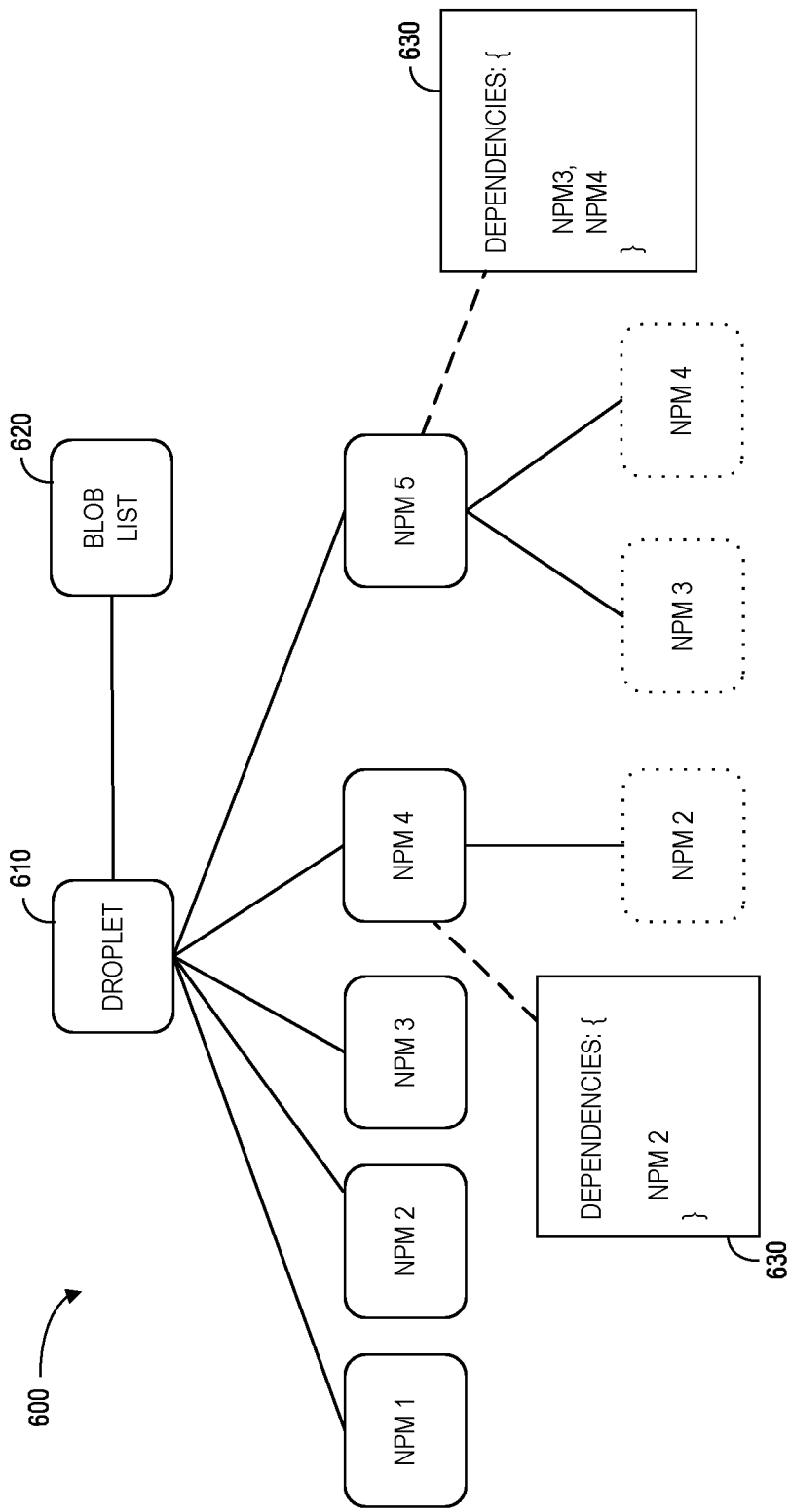
FIG. 6 illustrates a droplet root artifact with detected artifacts according to some embodiments.

FIG. 6 illustrates 600 a droplet root artifact 610 with detected artifacts according to some embodiments. In particular, the illustration 600 shows the situation for a droplet root resource 610 whose BLOBs from a BLOB list 620 were scanned for all known artefact types (e.g., associated with S520 and S530). Several npm modules were recognized and added as dependencies 630 to the root artifact. For module "npm 4," a dependency to "npm 2" was determined, and for "npm 5" dependencies to "npm 3" and "npm 4" were scanned in the corresponding package.json meta files and temporarily added as proxy artifacts (illustrated with dotted line boundaries in FIG. 6).

Figure 7:
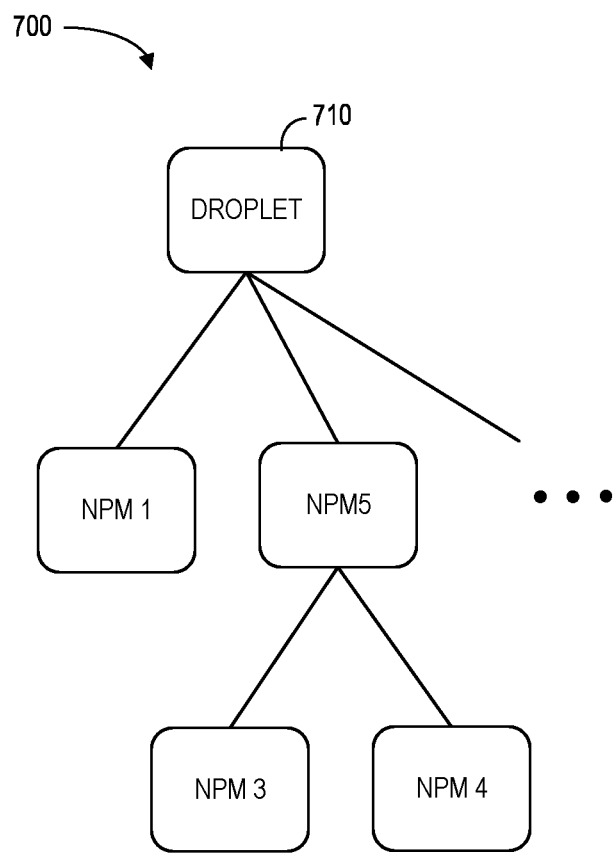
FIG. 7 illustrates resolved artifact dependencies in accordance with some embodiments.

FIG. 7 illustrates 700 resolved artifact dependencies 710 in accordance with some embodiments. In particular, the illustration 700 shows the situation after dependency analysis (step S540). All dependencies to proxies in the previous state have been removed by the actual dependency tree structure. Note that the very same artifact may appear multiple times in the set of dependent artifacts of the root, but with different paths.

Figure 8:
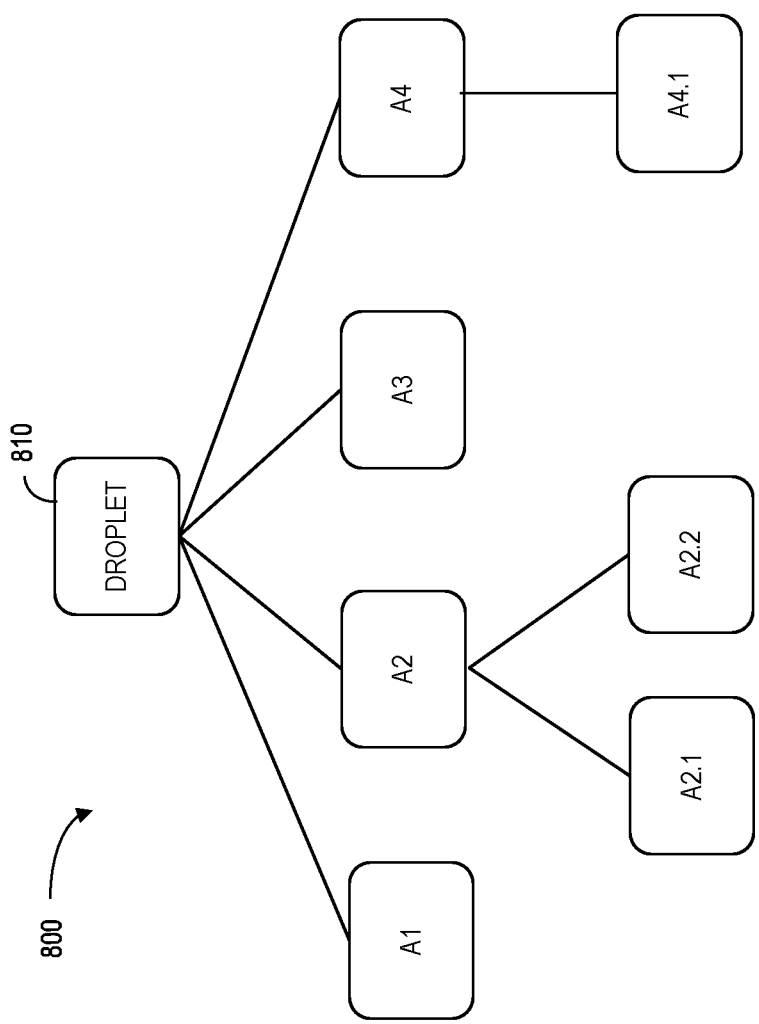
FIGS. 8 and 9 illustrate droplet artifacts and resource artifacts according to some embodiments.
Figure 9:
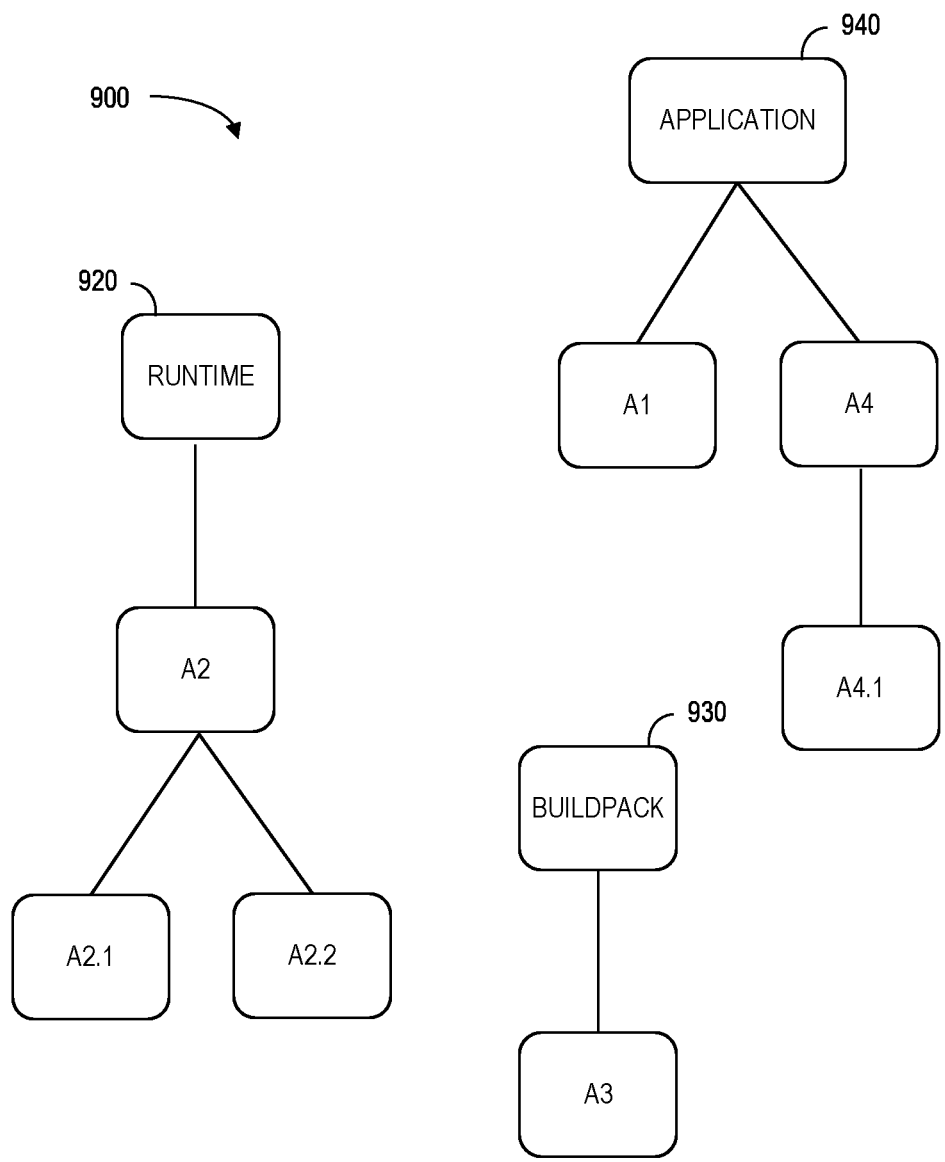

FIGS. 8 and 9 illustrate 800, 900 droplet artifacts and resource artifacts according to some embodiments (e.g., associated with step S550). In particular, FIG. 8 illustrates 800 (match sub resources) a droplet's artifact tree 810 presented after S540 has been performed. Assume, for example, that artifact "a4.1" was downloaded from an external repository during staging. FIG. 9 illustrates 900 the involved application 940 and buildpack 930 as well as a single runtime 920 in an artifact tree representation. The artifact tree of the runtime 920 recursively matches the droplet's artifact sub tree with root "a2" and thus a new runtime artifact node can be built in as child of the droplet node. The same also holds for the application 940 as well as the buildpack 930.

Figure 10:
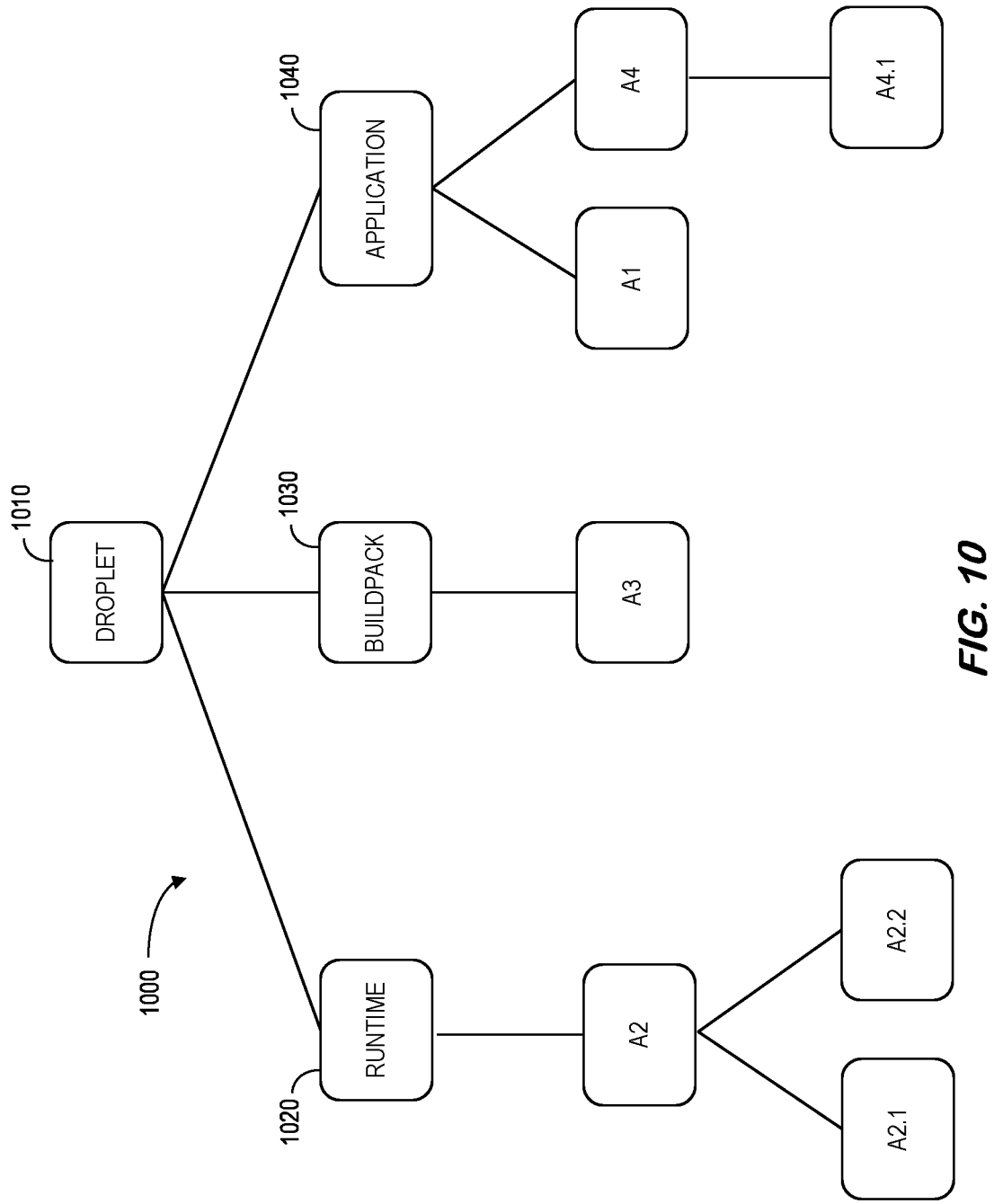
FIG. 10 illustrates a droplet dependency tree after resolution of sub-resource in accordance with some embodiments.

The resulting artifact tree after S550 is illustrated in FIG. 10 which shows 1000 a droplet dependency tree 1010, including a runtime portion 1020, a buildpack portion 1030, and an application portion 1040, after resolution of sub-resources in accordance with some embodiments. Note that "a4.1" is automatically linked correctly as an application dependency (although not appearing in the tree representation of the application itself). At S560, the final artifact tree representation is written as a stream of JSON objects in the response in depth-first-search order: "droplet" {"runtime" {"a2" {"a2.1", "a2.2"}}, "buildpack" {"a3"}, "application" {"a1", "a4" {"a4.1"}}.

Figure 11:
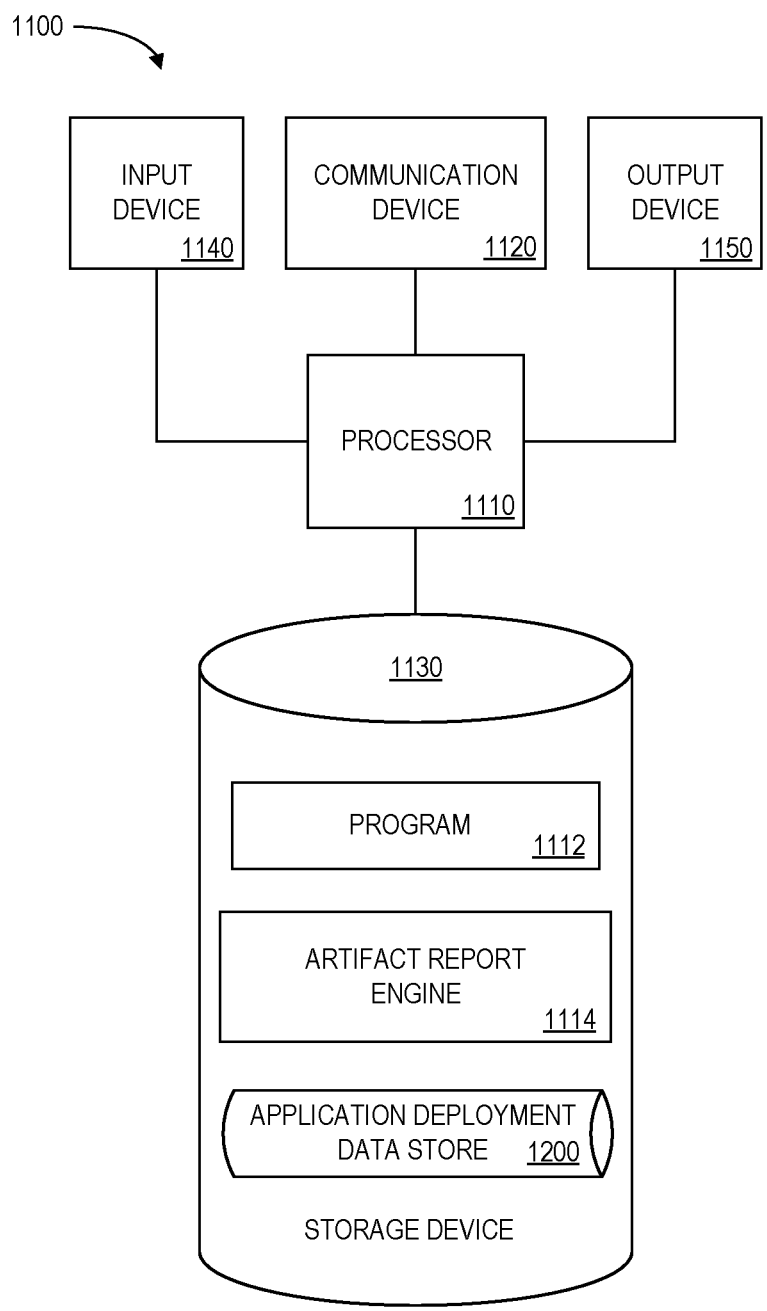
FIG. 11 is an apparatus or platform according to some embodiments.

Embodiments described herein may also be implemented using any number of different hardware configurations. For example, FIG. 11 is a block diagram of an apparatus or platform 1100 that may be, for example, associated with the system 400 of FIG. 4 (and/or any other system described herein). The platform 1100 comprises a processor 1110, such as one or more commercially available Central Processing Units ("CPUs") in the form of one-chip microprocessors, coupled to a communication device 1160 configured to communicate via a communication network (not shown in FIG. 11). The communication device 1160 may be used to communicate, for example, with one or more remote user platforms, controllers, staging platforms, online repositories, etc. The platform 1100 further includes an input device 1140 (e.g., a computer mouse and/or keyboard to input artifact scope parameters) and/an output device 1150 (e.g., a computer monitor to render a display, transmit results, and/or create reports about artifacts). According to some embodiments, a mobile device, monitoring physical system, and/or PC may be used to exchange information with the platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or an artifact report engine 1114 for controlling the processor 1110. The processor 1110 performs instructions of the programs 1112, 1114, and thereby operates in accordance with any of the embodiments described herein. For example, the processor 1110 may access the application deployment data store and, based on the information in the application deployment data store, perform the following for each resource associated with a scope of a cloud-based or on-premises environment/system infrastructure: create a root artifact of a tree; detect the root artifact's set of artifacts; build an artifact dependency tree; for droplet roots, match sub-resources of droplet resource roots; and write the root artifact recursively to a result stream. Based on the result streams, the processor 1110 may output the artifact report to a remote operator device.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores an application deployment data store 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
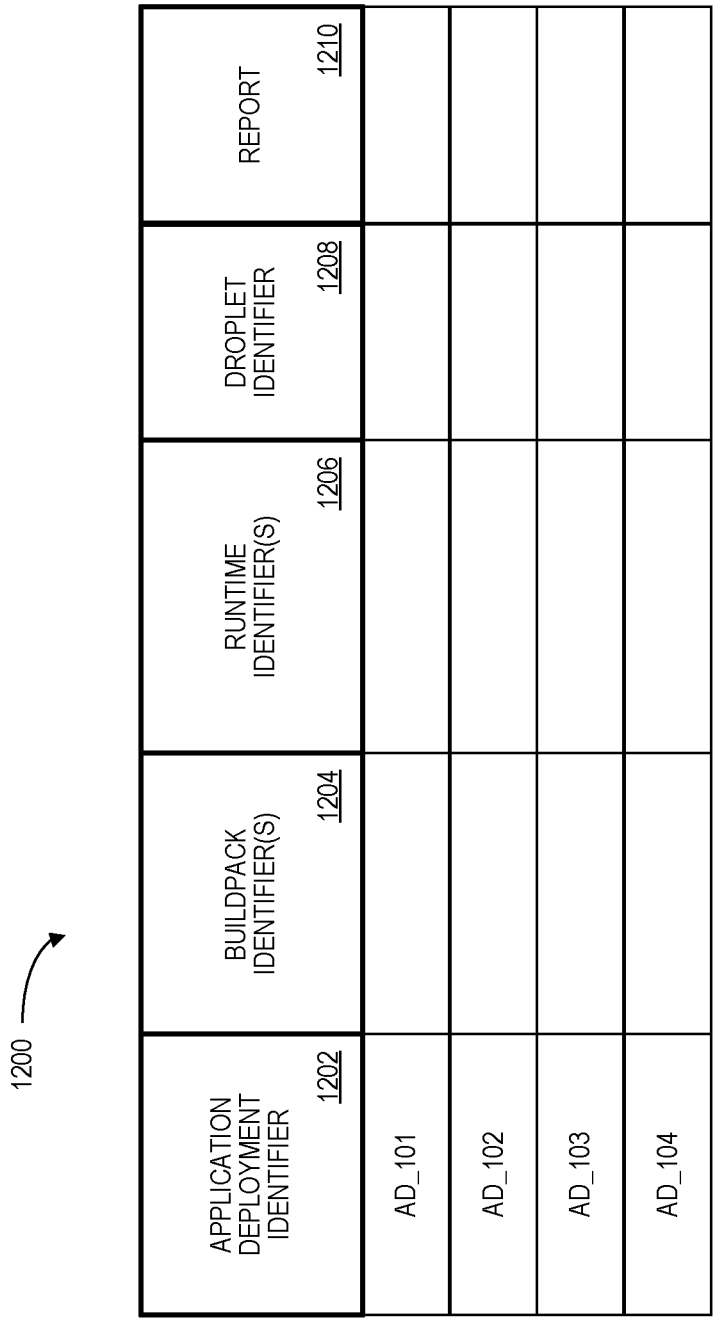
FIG. 12 is portion of application deployment data store in accordance with some embodiments.

Referring to FIG. 12, a table is shown that represents the application deployment data store 1200 that may be stored at the platform 1100 according to some embodiments. The table may include, for example, entries identifying applications that have been deployed via a cloud-based or on-premises environment/system infrastructure. The table may also define fields 1202, 1204, 1206, 1208, 1210 for each of the entries. The fields 1202, 1204, 1206, 1208, 1210 may, according to some embodiments, specify: an application deployment identifier 1202, a buildpack identifier 1204, a runtime identifier 1206, a droplet identifier 1208, and a report 1210. The application deployment data store 1200 may be created and updated, for example, when a new application is deployed, when an operator defines (or re-defines) an artifact report scope, etc.

The application deployment identifier 1202 might be a unique alphanumeric label or link that is associated with an application that has been deployed via a cloud-based or on-premises environment/system infrastructure (e.g., associated with a PaaS). The buildpack identifier 1204, runtime identifier 1206, and droplet identifier 1208 may all be used to determine associated artifacts in accordance with any of the embodiments described herein. The report 1210 might comprise a text file or stream identifier that includes information about the determined artifacts.

Figure 13:
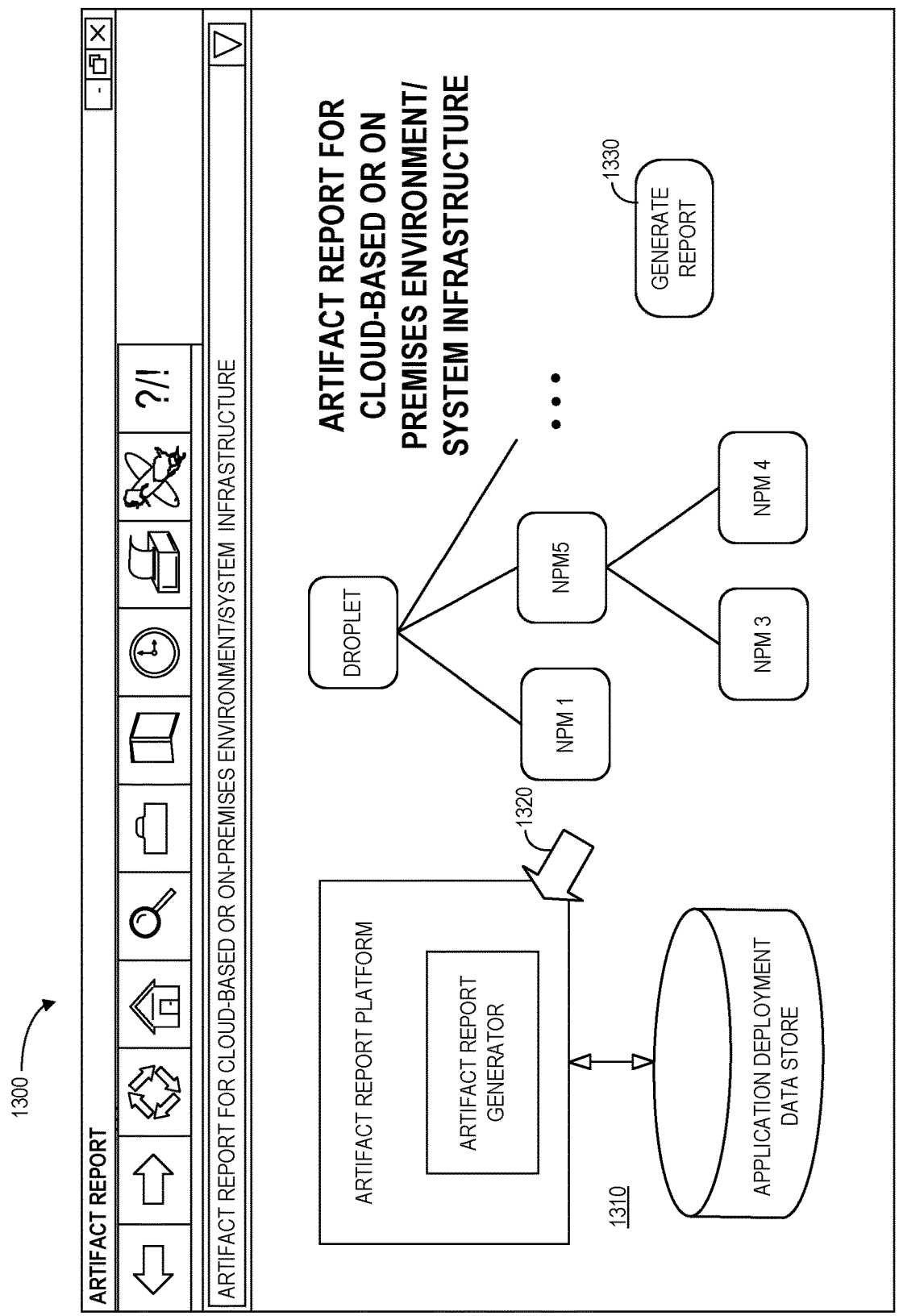
FIG. 13 is a human machine interface display according to some embodiments.

FIG. 13 is a human machine interface display 1300 associated with artifact reports for cloud-based or on-premises environment/system infrastructures in accordance with some embodiments. The display 1300 includes a graphical representation of elements of a system 1310, including an artifact report platform along with a representation of an application deployment data store 1320 and resolved artifact dependencies. Selection of an element (e.g., via a touchscreen or computer pointer 1320) may result in display of a pop-up window containing various options (e.g., to view report scope definition, artifact report results, perform a search or automated process, etc.). The display 1300 may also include an operator-selectable "Generate Report" icon 1340 to initiate an automated artifact report generation process. According to some embodiments, the display may also let an operator automatically perform an outdated version search, automatically identify redundant versions of a single component, automatically identify components associated with a license restriction, automatically identify components that need to be patched for security reasons, etc. Moreover, the operator may be able to search an artifact report based an artifact version and/or a range of artifact versions.

Thus, embodiments may provide for the automatic creation of an artifact report associated with a cloud-based or on-premises environment/system infrastructure. Moreover, embodiments may enable customers to get a detailed overview of artifact usage within a well-defined scope of resources on a PaaS. This may help to accomplish various tasks such as finding all occurrences of vulnerable open source components.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of artifact types, any of the embodiments described herein could be applied to other types of artifacts. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A system, comprising:
   an application deployment data store that contains electronic records associated with an application package uploaded by a deployer;
   an output port to provide an artifact report to a remote operator device; and
   an artifact report platform, coupled to the application deployment data store and the output port, adapted to perform the following:
   (i) access the application deployment data store,
   (ii) based on the information in the application deployment data store, perform the following for each resource associated with a scope of a cloud-based or on-premises environment/system infrastructure:
      (a) create a root artifact of a tree,
      (b) detect the root artifact's set of artifacts,
      (c) build an artifact dependency tree,
      (d) for droplet roots, match sub-resources of droplet resource roots, and
      (e) write the root artifact recursively to a result stream, and (iii) based on the result streams, output the artifact report to the remote operator device via the output port.

2. The system of claim 1, wherein the cloud-based infrastructure is associated with a Platform-as-a-Service ("PaaS") infrastructure.

3. The system of claim 1, wherein the scope of the artifact report is restricted to at least one of: (i) a single resource, (ii) an application, (iii) a droplet, (iv) a runtime, (v) a buildpack, (vi) multiple resources of the same type, and (vii) multiple resources of different types within a container resource.

4. The system of claim 1, wherein the artifact report platform extends a controller Application Programming Interface ("API") by several Representational State Transfer ("REST") endpoints via a RESTful API Modeling Language ("RAML").

5. The system of claim 4, wherein the artifact report comprises a textual stream of an array of artifacts and a single artifact object in the array is reported with a JavaScript Object Notation ("JSON") structure.

6. The system of claim 5, wherein each artifact object is associated with at least one of: (i) an artifact name, (ii) an artifact version, (iii) an artifact a type, and (iv) an artifact path.

7. The system of claim 1, wherein said detection of the root's set of artifacts is associated with a temporary artifact with an artifact type, an artifact name, and an artifact version as available from a meta data store.

8. The system of claim 7, wherein said building of the artifact dependency tree is associated with wherein there are multiple artifacts with the same artifact type, artifact name, and artifact version and the system selects the artifact with an artifact path that is closest to the path of the parent artifact of the proxy.

9. The system of claim 8, wherein said matching of the sub-resources of droplet resource roots is performed such that references to used resources including an application, a buildpack, and a runtime are stored in the droplet resource during staging.

10. The system of claim 9, wherein said matching is associated with a hash comparison.

11. The system of claim 1, wherein, responsive to the artefact report, the system will perform at least one of: (i) automatically perform an outdated version search, (ii) automatically identify redundant versions of a single component, (iii) automatically identify components associated with a license restriction, and (iv) automatically identify components that need to be patched for security reasons.

12. The system of claim 1, wherein a remote operator associated with the remote operator device may search the artifact report based on at least one of: (i) an artifact version, and (ii) a range of artifact versions.

13. A computer-implemented method, comprising:
accessing, by a computer processor of an artifact report platform, an application deployment data store that contains electronic records associated with an application package uploaded by a deployer;
based on the information in the application deployment data store, performing the following for each resource associated with a scope of a cloud-based or on-premises environment/system infrastructure:
(a) create a root artifact of a tree,
(b) detect the root artifact's set of artifacts,
(c) build an artifact dependency tree,
(d) for droplet roots, match sub-resources of droplet resource roots, and
(e) write the root artifact recursively to a result stream, and
based on the result streams, outputting an artifact report to the remote operator device via an output port.

14. The method of claim 13, wherein the cloud-based or on-premises environment/system infrastructure is associated with a Platform-as-a-Service ("PaaS") infrastructure.

15. The method of claim 13, wherein the scope of the artifact report is restricted to at least one of: (i) a single resource, (ii) an application, (iii) a droplet, (iv) a runtime, (v) a buildpack, (vi) multiple resources of the same type, and (vii) multiple resources of different types within a container resource.

16. The method of claim 13, wherein the artifact report platform extends a controller Application Programming Interface ("API") by several Representational State Transfer ("REST") endpoints via a RESTful API Modeling Language ("RAML").

17. The method of claim 16, wherein the artifact report comprises a textual stream of an array of artifacts and a single artifact object in the array is reported with a JavaScript Object Notation ("JSON") structure.

18. The method of claim 17, wherein each artifact object is associated with at least one of: (i) an artifact name, (ii) an artifact version, (iii) an artifact a type, and (iv) an artifact path.

19. A non-transitory, computer readable medium having executable instructions stored therein, the medium comprising:
instructions to access, by a computer processor of an artifact report platform, an application deployment data store that contains electronic records associated with an application package uploaded by a deployer;
based on the information in the application deployment data store, instructions to perform the following for each resource associated with a scope of a cloud-based or on-premises environment/system infrastructure:
(a) create a root artifact of a tree,
(b) detect the root artifact's set of artifacts,
(c) build an artifact dependency tree,
(d) for droplet roots, match sub-resources of droplet resource roots, and
(e) write the root artifact recursively to a result stream, and
based on the result streams, instructions to output an artifact report to the remote operator device via an output port.

20. The medium of claim 1, wherein:
said detection of the root's set of artifacts is associated with a temporary artifact with an artifact type, an artifact name, and an artifact version as available from a meta data store;
said building of the artifact dependency tree is associated with wherein there are multiple artifacts with the same artifact type, artifact name, and artifact version and the system selects the artifact with an artifact path that is closest to the path of the parent artifact of the proxy;
said matching of the sub-resources of droplet resource roots is performed such that references to used resources including an application, a buildpack, and a runtime are stored in the droplet resource during staging and said matching is associated with a hash comparison.

* * * * *